United States Patent
Gu

(10) Patent No.: US 11,566,122 B2
(45) Date of Patent: Jan. 31, 2023

(54) DAMPING THERMOPLASTIC OLEFIN ELASTOMERS

(71) Applicant: PolyOne Corporation, Avon Lake, OH (US)

(72) Inventor: Jiren Gu, Crystal Lake, IL (US)

(73) Assignee: Avient Corporation, Avon Lake, OH (US)

( * ) Notice: Subject to any disclaimer, the term of this patent is extended or adjusted under 35 U.S.C. 154(b) by 300 days.

(21) Appl. No.: 16/760,982

(22) PCT Filed: Nov. 1, 2018

(86) PCT No.: PCT/US2018/058654
§ 371 (c)(1),
(2) Date: May 1, 2020

(87) PCT Pub. No.: WO2019/089895
PCT Pub. Date: May 9, 2019

(65) Prior Publication Data
US 2020/0263014 A1 Aug. 20, 2020

Related U.S. Application Data

(60) Provisional application No. 62/580,143, filed on Nov. 1, 2017.

(51) Int. Cl.
*C08L 23/12* (2006.01)
*C08J 9/00* (2006.01)

(52) U.S. Cl.
CPC .......... *C08L 23/12* (2013.01); *C08J 9/0061* (2013.01); *C08J 2323/12* (2013.01); *C08J 2423/08* (2013.01); *C08J 2423/12* (2013.01); *C08J 2431/04* (2013.01); *C08J 2453/00* (2013.01); *C08L 2205/025* (2013.01); *C08L 2205/035* (2013.01)

(58) Field of Classification Search
CPC .......... C08L 23/12; C08L 2205/025; C08L 2205/035; C08L 53/025; C08L 23/16; C08L 53/00; C08J 9/0061; C08J 2323/12; C08J 2423/08; C08J 2423/12; C08J 2431/04; C08J 2453/00; C08J 9/06; C08J 9/122; C08J 2201/026; C08J 2300/26; C08J 2323/16; C08J 2491/00; C08J 2453/02; C08K 2003/265
See application file for complete search history.

(56) References Cited

U.S. PATENT DOCUMENTS

| | | |
|---|---|---|
| 2008/0299397 A1 | 12/2008 | Kenens et al. |
| 2011/0021103 A1 | 1/2011 | Alper et al. |
| 2013/0101927 A1* | 4/2013 | Taneichi ................ C08L 23/20 430/5 |
| 2016/0145406 A1* | 5/2016 | Bieber .................. C09J 123/16 521/91 |
| 2016/0230000 A1* | 8/2016 | Gu ......................... B32B 27/34 |

FOREIGN PATENT DOCUMENTS

| | | |
|---|---|---|
| EP | 1908795 A1 | 4/2008 |
| JP | 11130825 A | 5/1999 |
| JP | 2015071671 A | 4/2015 |
| WO | 2005049670 A1 | 6/2005 |
| WO | 2006101924 A2 | 9/2006 |
| WO | 2006101928 A2 | 9/2006 |
| WO | 2006101966 A1 | 9/2006 |
| WO | 2006101999 A2 | 9/2006 |
| WO | 2006102155 A2 | 9/2006 |
| WO | 2014194155 A1 | 12/2014 |
| WO | 2015017400 A1 | 2/2015 |
| WO | 2016130627 A1 | 8/2016 |
| WO | 2016130630 A1 | 8/2016 |
| WO | 2016130631 A1 | 8/2016 |
| WO | 2016130639 A1 | 8/2016 |

* cited by examiner

*Primary Examiner* — Irina S Zemel
(74) *Attorney, Agent, or Firm* — David V. Monateri; Emily E. Vlasek; Michael J. Sambrook

(57) ABSTRACT

A thermoplastic elastomer compound includes polyolefin elastomer, high softening point tackifier, and, optionally, styrenic block copolymer. When styrenic block copolymer is present, the weight ratio of polyolefin elastomer to styrenic block copolymer is no less than about 1:1. The polyolefin elastomer has a POE Tan Delta Peak Temperature, the styrenic block copolymer has a SBC Tan Delta Peak Temperature, and the thermoplastic elastomer compound has a Compound Tan Delta Peak Temperature. The Compound Tan Delta Peak Temperature is greater than the POE Tan Delta Peak Temperature. When styrenic block copolymer is present, Compound Tan Delta Peak Temperature is also greater than the SBC Tan Delta Peak Temperature. The thermoplastic elastomer compound exhibits useful damping properties at or above room temperature and can be formed into plastic articles, including foamed plastic articles and/or crosslinked plastic articles, which can be useful for a variety of damping applications.

22 Claims, No Drawings

DAMPING THERMOPLASTIC OLEFIN ELASTOMERS

CLAIM OF PRIORITY

This application claims the benefit of U.S. Provisional Patent Application Ser. No. 62/580,143 and filed on Nov. 1, 2017, which is hereby incorporated by reference in its entirety.

FIELD OF THE INVENTION

This invention relates to thermoplastic elastomer compounds containing polyolefin elastomers and that exhibit useful damping properties at or above room temperature.

BACKGROUND OF THE INVENTION

Demand exists in a variety of applications for materials that exhibit damping properties. In general, damping is the dissipation of mechanical energy from a system. Damping can be important in applications such as electronics, sound isolation, automotive and transportation, building and construction, household appliances, industrial equipment, firearms, healthcare and medical devices, and personal and/or sports protection.

The capacity of a material for damping is related to its peak temperature of the tangent of delta (Tan Delta Peak Temperature), which can be determined by dynamic mechanical analysis (DMA) as described, for example, by M. P. Sepe in "Thermal Analysis of Polymers", *Rapra Review Reports*, Vol. 8, No. 11, 1997, which is incorporated herein by reference. The tangent of delta (Tan Delta) of a material is the ratio of its loss modulus (E") to its storage modulus (E'). Consequently, as the value of Tan Delta increases, the response of the material is relatively more viscous than it is elastic, which thus provides greater damping. When graphically depicted against temperature, a Tan Delta curve includes a prominent peak at a particular temperature, which is the Tan Delta Peak Temperature and also can be representative of or comparable to the glass transition temperature (Tg) of the material. In general, a material with a Tan Delta Peak Temperature which is relatively nearer to an application temperature, such as at or above room temperature, will possess better damping properties than a material with a Tan Delta Peak Temperature which is relatively lower than the application temperature.

Thermoplastic elastomers (TPE), which are polymer materials that exhibit elasticity while remaining thermoplastic, can be used for damping applications. Thermoplastic elastomers can include styrenic block copolymers (SBC), thermoplastic vulcanizates (TPV), thermoplastic olefins (TPO), copolyesters (COPE), thermoplastic urethanes (TPU), copolyamides (COPA), and olefin block copolymers (OBC).

Recently, damping thermoplastic elastomer compounds including certain styrenic block copolymers (SBC) have been described in publications including United States Patent Appl. Pub. No. 2016/0230000 and International Appl. Pub. Nos. WO 2016/130627; WO 2016/130630; WO 2016/130631; and WO 2016/130639; all of which are commonly owned by PolyOne Corporation. Although such described SBC-based damping thermoplastic elastomer compounds can be very useful for a variety of applications, certain limitations still exist.

For example, SBC-based damping thermoplastic elastomer compounds can be less suitable for applications involving exposure to oil because SBC can be relatively more sensitive to oil than other types of TPE.

Further, for example, SBC-based damping thermoplastic elastomer compounds can be less suitable for further processing by certain techniques such as high speed extrusion, which can be used to make certain tapes and films, or fiber spinning, which can be used to make fibers for performance textiles and apparel.

Finally, for example, SBC-based damping thermoplastic elastomer compounds can be relatively more expensive because certain SBC can have a relatively higher cost as a raw material than other types of TPE.

However, like most conventional SBC, other types of TPE as neat polymers typically have a Tan Delta Peak Temperature that is significantly below room temperature. Therefore, such other types of TPE generally are not considered useful for damping applications at or above room temperature.

SUMMARY OF THE INVENTION

Consequently, a need exists for damping thermoplastic elastomer compounds which are based on TPE other than SBC (i.e., compounds which include less than a major amount of SBC or which are free of SBC), but which also exhibit useful damping properties at or above room temperature.

The aforementioned needs are met by one or more aspects of the present invention.

It has been found that, by adding high softening point tackifier to polyolefin elastomer to provide a thermoplastic elastomer compound, the POE Tan Delta Peak Temperature of the polyolefin elastomer can be shifted to a higher temperature (i.e., the Compound Tan Delta Peak Temperature) and, thereby, the damping capacity of the polyolefin elastomer can be increased for an intended end-use application at a given temperature, such as at or above room temperature.

One aspect of the invention is a thermoplastic elastomer compound that includes polyolefin elastomer, high softening point tackifier, and, optionally, styrenic block copolymer. When the optional styrenic block copolymer is present, the weight ratio of polyolefin elastomer to styrenic block copolymer is no less than about 1:1. The polyolefin elastomer has a POE Tan Delta Peak Temperature, the optional styrenic block copolymer has a SBC Tan Delta Peak Temperature, and the thermoplastic elastomer compound has a Compound Tan Delta Peak Temperature. The Compound Tan Delta Peak Temperature is greater than the POE Tan Delta Peak Temperature. When the optional styrenic block copolymer is present, the Compound Tan Delta Peak Temperature is also greater than the SBC Tan Delta Peak Temperature.

Another aspect of the invention is a plastic article formed from the thermoplastic elastomer compound as described herein.

A further aspect of the invention is a method of making a plastic article from the thermoplastic elastomer compound as described herein.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the present invention is directed to a thermoplastic elastomer compound as described herein. In other embodiments, the present invention is directed to a plastic article formed from the thermoplastic elastomer compound as described herein. In further embodiments, the present invention is directed to a method of making a plastic article from the thermoplastic elastomer compound as described herein. Required and optional features of these and other embodiments of the present invention are described.

As used herein, the term "compound" means a composition or mixture resulting from melt mixing, or compounding, a neat polymer and at least one other ingredient including but not limited to one or more additives, or one or more other polymers, or both.

As used herein, the term "Compound Tan Delta Peak Temperature" means the Tan Delta Peak Temperature for a compound.

As used herein, the terms "formed from" or "forming" mean, with respect to an article and a compound, that the article is molded, extruded, calendered, thermoformed, or otherwise shaped from the compound. As such, the terms "formed from" or "forming" mean, in some embodiments, the article can comprise, consist essentially of, or consist of, the compound.

As used herein, the term "free of" a certain component or substance means, in some embodiments, that no amount of that component or substance is intentionally present, and, in other embodiments, that no functionally effective amount of that component or substance is present, and, in further embodiments, that no amount of that component or substance is present.

As used herein, the term "high softening point tackifier" means a tackifier having a softening point of at least 80° C. according to ASTM 6493.

As used herein, the term "softening point" means a material softening temperature as measured by a ring and ball type method according to ASTM 6493.

As used herein, the term "POE Tan Delta Peak Temperature" means the Tan Delta Peak Temperature for a neat polyolefin elastomer; that is, for the polyolefin elastomer, itself, prior to compounding it with any other ingredients of a compound.

As used herein, the term "room temperature" means a range of temperature of a defined environment, usually an indoor environment, which is generally considered comfortable for human habitation, and, can include, for example, any temperature ranging from about 15° C. to about 26° C.

As used herein, the term "SBC Tan Delta Peak Temperature" means the Tan Delta Peak Temperature for a neat styrenic block copolymer; that is, for the styrenic block copolymer, itself, prior to compounding it with any other ingredients of a compound.

As used herein, the term "Tan Delta" means the tangent of delta of a material and is the ratio of the material's loss modulus (E") to the material's storage modulus (E').

As used herein, the term "Tan Delta Peak Temperature" means the temperature at which a prominent peak appears in a graphical depiction of Tan Delta against temperature for a material, as determined by dynamic mechanical analysis using TA Instruments Dynamic Mechanical Analysis Model Q800 in "shear sandwich" mode and for a temperature scan from −40° C. to 100° C. increasing at a rate of 5° C. per minute and with an oscillation frequency of 10 Hz.

Thermoplastic Elastomer Compound

In some embodiments, the present invention is directed to thermoplastic elastomer compounds that include polyolefin elastomer, high softening point tackifier, and, optionally, styrenic block copolymer.

It has been found that, by adding high softening point tackifier to polyolefin elastomer to provide a thermoplastic elastomer compound, the POE Tan Delta Peak Temperature of the polyolefin elastomer can be shifted to a higher temperature (i.e., the Compound Tan Delta Peak Temperature). That is, for thermoplastic elastomer compounds of the present invention, the Compound Tan Delta Peak Temperature is greater than the POE Tan Delta Peak Temperature. When styrenic block copolymer is present, the Compound Tan Delta Peak Temperature also is greater than the SBC Tan Delta Peak Temperature.

In some embodiments, the Compound Tan Delta Peak Temperature is at least −10° C. In other embodiments, the Compound Tan Delta Peak Temperature is at least 0° C. In further embodiments, the Compound Tan Delta Peak Temperature is at least room temperature. In even further embodiments, the Compound Tan Delta Peak Temperature is from about −10° C. to about 70° C., and, in other embodiments, is from about 5° C. to about 50° C.

Polyolefin Elastomer

Thermoplastic elastomer compounds of the present invention include one or more polyolefin elastomers (POE).

The polyolefin elastomer has a POE Tan Delta Peak Temperature. In some embodiments, the POE Tan Delta Peak Temperature ranges from about −65° C. to about −20° C.

Polyolefin elastomers that are suitable for use in the present invention include any available polyolefin elastomers that, when combined with the high softening point tackifier, can provide the thermoplastic elastomer compound with useful damping properties at the temperature of an intended end-use application, for example, room temperature or temperatures higher or lower than room temperature. Suitable polyolefin elastomers can be selected also to provide other properties desirable for the end-use application. The present invention contemplates the use of a single type of polyolefin elastomer or combinations of two or more different types of polyolefin elastomers.

Non-limiting examples of suitable polyolefin elastomer include propylene-based elastomers, ethylene/α-olefin random copolymers, ethylene/α-olefin block copolymers, ethylene-vinyl acetate copolymers, and combinations thereof.

Suitable propylene-based elastomers include those described in International Appl. Pub. No. WO 2005/049670 filed by ExxonMobil Chemical.

For example, in some embodiments, suitable propylene-based elastomers are comprised of (a) at least about 60 weight percent of propylene-derived units, (b) at least about 6 weight percent of ethylene-derived units, and (c) from about 0.3 to about 10 weight percent of diene-derived units, based on a combined weight of the propylene-derived units, the ethylene-derived units, and the diene-derived units.

Non-limiting examples of commercial available propylene-based elastomers include those available under the VISTAMAXX brand from ExxonMobil Chemical, such as VISTAMAXX 3000 propylene-based elastomer.

Typically, commercially available grades of VISTAMAXX propylene-based elastomer are reported to have a glass transition temperature (Tg) ranging from about −30° C. to about −20° C.

Suitable ethylene/α-olefin random copolymers include random copolymers formed by polymerizing ethylene with one or more $C_3$-$C_{10}$ α-olefins such as propylene, 1-butene, 1-pentene, 1-hexene, 4-methyl-1-pentene, 1-heptene, 1-octene, 1-nonene, and 1-decene.

For example, in some embodiments, suitable ethylene/α-olefin random copolymers include ethylene/propylene copolymers, ethylene/butene copolymers, ethylene/hexane copolymers, and ethylene/octene copolymers.

Non-limiting examples of commercial available ethylene/α-olefin random copolymers include those available under the ENGAGE brand from Dow Chemical, such as ENGAGE 8540 polyolefin elastomer which is an ethylene/octene copolymer.

Typically, commercially available grades of ENGAGE ethylene/α-olefin random copolymers are reported to have a glass transition temperature (Tg) of about −30° C.

Suitable ethylene/α-olefin block copolymers, also known as olefin block copolymers (OBC), include those described in International Appl. Pub. Nos. WO 2006/101966; WO 2006/102155; WO 2006/101999; WO 2006/101928; and WO 2006/101924; all of which filed by Dow Global Technologies.

For example, in some embodiments, suitable ethylene/α-olefin block copolymers include block copolymers formed by polymerizing ethylene with one or more $C_3$-$C_{10}$ α-olefins such as propylene, 1-butene, 1-pentene, 1-hexene, 4-methyl-1-pentene, 1-heptene, 1-octene, 1-nonene, and 1-decene, wherein the block copolymer is characterized by alternating blocks of "hard" (i.e., highly rigid) segments and "soft" (i.e., highly elastomeric) segments. In some embodiments, the hard segments include greater than about 95 weight percent of polymerized units of ethylene based on the weight of the segment, and the soft segments include greater than about 5 weight percent of polymerized units of α-olefin based on the weight of the segment. In other embodiments, the hard segments include greater than about 98 weight percent of polymerized units of ethylene based on weight of the segment, and the soft segments include greater than about 50 weight percent of polymerized units of α-olefin based on weight of the segment.

Non-limiting examples of commercial available ethylene/α-olefin block copolymers include those available under the INFUSE brand from Dow Chemical, such as INFUSE 9100 olefin block copolymer.

Typically, commercially available grades of INFUSE ethylene/α-olefin block copolymers are reported to have a glass transition temperature (Tg) ranging from about −65° C. to about −55° C.

Suitable ethylene-vinyl acetate copolymers include conventional or commercially available ethylene-vinyl acetate copolymers.

Non-limiting examples of commercial available ethylene-vinyl acetate copolymers include those available under the ELVAX brand from DuPont, such as ELVAX 460 ethylene-vinyl acetate copolymer resin.

Typically, commercially available grades of ethylene-vinyl acetate copolymers are reported to have a glass transition temperature (Tg) ranging from about −40° C. to about −20° C.

High Softening Point Tackifier

Thermoplastic elastomer compounds of the present invention include one or more high softening point tackifiers.

By adding high softening point tackifier to polyolefin elastomer, the POE Tan Delta Peak Temperature of the polyolefin elastomer, and, when styrenic block copolymer is present, the SBC Tan Delta Peak Temperature of the styrenic block copolymer, can be shifted to a higher temperature (i.e., the Compound Tan Delta Peak Temperature).

High softening point tackifiers that are suitable for use in the present invention have a softening point of at least about 80° C. according to ASTM 6493. In some embodiments, the softening point is at least 100° C., and, in other embodiments, at least about 120° C., and, in further embodiments, at least about 140° C. In even further embodiments, the softening point ranges from about 80° C. to about 150° C.

Suitable high softening point tackifiers include those derived from rosin feedstock, terpene feedstock, or hydrocarbon feedstock. Hydrocarbon-based high softening point tackifiers can be aliphatic or aromatic, and saturated or unsaturated.

Examples of commercially available high softening point tackifiers include hydrogenated hydrocarbon resins available under the ARKON brand, such as grades P100, P115, P125, and P140, from Arakawa Chemical Industries, Ltd.; hydrogenated hydrocarbon resins available under the EASTOTAC brand, such as grades H-125-W, H-140-W, and H-142-W, from Eastman Chemical Company; hydrogenated hydrocarbon resins available under the PLASTOLYN brand, such as grade R1140, from Eastman Chemical Company; and hydrogenated hydrocarbon resins available under the REGALREZ brand, such as grade 1139, from Eastman Chemical Company.

In some embodiments, the high softening point tackifier includes an amorphous hydrocarbon resin derived from aromatic hydrocarbon feedstock. In further embodiments, the high softening point tackifier is fully hydrogenated and has a saturated cyclo-aliphatic structure.

In some embodiments, the high softening point tackifier has a weight average molecular weight ranging from about 400 to about 3,500. In other embodiments, the high softening point tackifier has a weight average molecular weight ranging from about 1,000 to about 2,000.

High softening point tackifier is included in the thermoplastic elastomer compound of the present invention in amount ranging from about 20 parts by weight to about 200 parts by weight, per 100 parts by weight of the polyolefin elastomer. In some embodiments, the amount of high softening point tackifier ranges from about 30 parts by weight to about 150 parts by weight, per 100 parts by weight of the polyolefin elastomer. In further embodiments, a weight ratio of the polyolefin elastomer relative to the high softening point tackifier is from about 1:1 to about 3:1.

It is believed that, in general, a relatively higher proportion of high softening point tackifier is required to shift the Tan Delta Peak Temperature to a higher temperature for polyolefin elastomer having a relatively higher molecular weight. Conversely, it is believed that, in general, a relatively lower proportion of high softening point tackifier is required to shift the Tan Delta Peak Temperature to a higher temperature for polyolefin elastomer having a relatively lower molecular weight.

Care should be taken to ensure that the thermoplastic elastomer compound of the present invention is formulated to provide properties desirable for a TPE compound and not properties more commonly observed in adhesive compositions. Generally, adhesive compositions are different from TPE compounds at least because adhesive compositions typically are relatively low viscosity compositions which do not possess the useful mechanical properties of TPE compounds. Accordingly, even if up to about 200 parts by weight of high softening point tackifier is used per 100 parts by weight of styrenic block copolymer, the thermoplastic elastomer compound of the present invention is not an adhesive composition. For example, the thermoplastic elastomer compound is not tacky, or it is not sticky to the touch of a human hand.

Optional Styrenic Block Copolymer

In some embodiments, thermoplastic elastomer compounds of the present invention include one or more styrenic block copolymers.

The styrenic block copolymer has a SBC Tan Delta Peak Temperature. In some embodiments, the SBC Tan Delta Peak Temperature ranges from about −40° C. to about −10° C.

Styrenic block copolymers that are suitable for use in the present invention include any available styrenic block copolymers that, when combined with the polyolefin elastomer and the high softening point tackifier, can provide the thermoplastic elastomer compound with useful damping properties at the temperature of an intended end-use application, for example, room temperature or temperatures higher or lower than room temperature. Suitable styrenic block copolymers can be selected also to provide other properties desirable for the end-use application. When styrenic block copolymer is included, the present invention contemplates the use of a single type of styrenic block copolymer or combinations of two or more different types of styrenic block copolymers.

Non-limiting examples of suitable styrenic block copolymers include styrene-ethylene/butylene-styrene (SEBS) block copolymer, styrene-ethylene/propylene-styrene (SEPS) block copolymer, styrene-ethylene/ethylene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

Non-limiting examples of commercially available styrenic block copolymers include those available under the KRATON brand from Kraton Polymers, such as grades G1641, G1642, G1643, G1645, MD6958, and MD6959; those available under the SEPTON brand from Kuraray, such as the 4000 series and including grade 4055; those available under the HYBRAR brand from Kuraray, such a grades 7125 and 7135; and those available under the SIB STAR brand from Kaneka.

Typically, commercially available grades of styrenic block copolymers are reported to have a glass transition temperature (Tg) ranging from about −80° C. to about −15° C.

According to the present invention, styrenic block copolymer is an optional ingredient. Styrenic block copolymer can be useful to include, for example, for certain embodiments of the present invention in which it is desirable for the thermoplastic elastomer compound to have relatively low hardness (i.e., high softness). However, according to the present invention, when styrenic block copolymer is present, the weight ratio of polyolefin elastomer to styrenic block copolymer is no less than about 1:1.

In some embodiments, the weight ratio of polyolefin elastomer to styrenic block copolymer is no less than about 3:1. In other embodiments, the weight ratio of polyolefin elastomer to styrenic block copolymer is no less than about 8:1.

In some embodiments, the thermoplastic elastomer compound is free of styrenic block copolymer except for styrene-ethylene-ethylene/propylene-styrene (SEEPS) block copolymer.

In other embodiments, the thermoplastic elastomer compound is free of styrenic block copolymer.

Optional Non-Elastomeric Thermoplastic Polymer

In some embodiments, the thermoplastic elastomer compound further includes non-elastomeric thermoplastic polymer as secondary polymer.

Such secondary polymer should be compatible with the polyolefin elastomer and, when present, the styrenic block copolymer, and can, for example, contribute to improved processability or desirable physical properties, such as hardness, in the thermoplastic elastomer compound.

Suitable secondary polymer includes non-elastomeric polyolefin-based thermoplastic resins, including homopolymers, copolymers, blends of polymers, mixtures of polymers, alloys of polymers, and combinations thereof.

Non-limiting examples of non-elastomeric polyolefins suitable for use in the present invention include polyethylene (including low-density (LDPE), high-density (HDPE), ultra-high molecular weight (UHDPE), linear-low-density (LLDPE), very-low density, etc.), polypropylene, polybutylene, polyhexalene, and polyoctene. In some embodiments, high density polyethylene (HDPE) and/or polypropylene (PP) are preferred. Such polyolefins are commercially available from a number of sources.

Suitable secondary polymer also includes polyphenylene ethers (PPE). Non-limiting examples of types of PPE, sometimes also referred to as polyphenylene oxide, can include poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dimethoxy-1,4-phenylene ether), poly(2,6-di(chloro methyl)-1,4-phenylene ether), poly(2,6-di(bromo methyl)-1,4-phenylene ether), poly(2,6-diphenyl-1,4-phenylene ether), poly(2,6-ditoluyl-1,4-phenylene ether), poly(2,6-dichloro-1,4-phenylene ether), poly(2,6-dibenzyl-1,4-phenylene ether), poly(2,5-dim ethyl-1,4-phenylene ether), and combinations thereof.

Optional Plasticizer

In some embodiments, the thermoplastic elastomer compound further includes plasticizer. Plasticizer can be used, for example, to adjust softness and/or improve flow or other properties of the thermoplastic elastomer compound.

Any conventional oil capable of plasticizing the polyolefin elastomer and/or the styrenic block copolymer, such as mineral oil, vegetable oil, synthetic oil, etc., can be used in the present invention. Examples of commercially available oils include those available under the PURETOL 380 brand from Petro-Canada, and those available under the PRIMOL 382 brand from ExxonMobil.

In some embodiments, plasticizers with a higher molecular weight than that of the aforementioned conventional oils can be used. Polyisobutene (PIB) is an example of such a plasticizer with a relatively higher molecular weight. For example, medium- to high-molecular weight PIB is commercially available under the OPPANOL brand from BASF.

Optional Filler

In some embodiments, the thermoplastic elastomer compound further includes inorganic filler.

Inorganic filler can be used, for example, to lower the cost and/or control properties of the thermoplastic elastomer compound. In other embodiments, the inorganic filler also can be used, for example, as a mineral filler flame retardant.

Non-limiting examples of inorganic fillers include iron oxide, zinc oxide, magnesium oxide, titanium oxide, zirconium oxide, titanium dioxide, alumina, silica, silica-alumina, aluminum hydroxide, magnesium hydroxide, calcium hydroxide, magnesium carbonate, calcium carbonate (heavy, light, colloidal), barium sulfate, calcium sulfate, sodium sulfate, calcium sulfite, calcium silicate, calcium phosphate, magnesium phosphate, talc, mica, kaolin, clay, wollastonite, hydrotalcite, glass beads, glass powders, silica sand, silica rock, silicon nitride, quartz powder, volcanic pumice, diatomaceous earth, white carbon, iron powder and aluminum powder.

In some embodiments, the inorganic filler is calcium carbonate, talc, or mixtures thereof.

Optional Other Additives

In some embodiments, the thermoplastic elastomer compound further includes one or more other additives.

Suitable optional additive include conventional or commercially available plastics additives. Those skilled in the art of thermoplastics compounding, without undue experimentation, can select suitable additives from available references, for example, E. W. Flick, "Plastics Additives Database," *Plastics Design Library* (Elsevier 2004).

Optional additives can be used in any amount that is sufficient to obtain a desired processing or performance property for the thermoplastic elastomer compound and/or the overmolded thermoplastic article. The amount should not be wasteful of the additive nor detrimental to the processing or performance of the thermoplastic elastomer compound and/or the overmolded thermoplastic article.

Non-limiting examples of additives suitable for use in the present invention include one or more selected from antioxidants and stabilizers; blowing and foaming agents; bonding agents; colorants, such as pigments or dyes; crosslinking agents; flame retardants and smoke suppressants; impact modifiers; ultraviolet light absorbers; and waxes.

Ranges of Ingredients in the TPE Compounds

Table 1 below shows the acceptable, desirable, and preferable ranges of ingredients for the thermoplastic elastomer compound of the present invention, based on 100 parts by weight of the polyolefin elastomer (POE) included in the thermoplastic elastomer compound.

Thermoplastic elastomer compounds of the present invention can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise herein, any disclosed number is intended to refer to both exactly the disclosed number and "about" the disclosed number, such that either possibility is contemplated within the possibilities of Table 1 as embodiments of compounds for use in the present invention.

TABLE 1

Thermoplastic Elastomer Compound
(parts by weight per 100 parts by weight of POE)

| Ingredient | Acceptable | Desirable | Preferable |
| --- | --- | --- | --- |
| Polyolefin Elastomer | 100 | 100 | 100 |
| High Softening Point Tackifier | 20 to 200 | 25 to 170 | 30 to 140 |
| Optional Styrenic Block Copolymer | 0 to 100 | 0 to 50 | 0 to 33 |
| Optional Non-Elastomeric Thermoplastic Polymer | 0 to 300 | 0 to 200 | 0 to 150 |
| Optional Plasticizer | 0 to 200 | 20 to 150 | 40 to 130 |
| Optional Filler | 0 to 150 | 0 to 100 | 0 to 80 |
| Optional Other Additives | 0 to 100 | 0 to 80 | 0 to 50 |

Processing and Methods of Making Plastic Articles

The preparation of thermoplastic elastomer compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later forming, extrusion, molding, thermoforming, foaming, calendering, and/or other processing into plastic articles.

Subsequent forming, extrusion, molding, thermoforming, foaming, calendering, and/or other processing techniques are well known to those skilled in the art of thermoplastics polymer engineering. Without undue experimentation but with reference to publications such as "Extrusion, The Definitive Processing Guide and Handbook", "Handbook of Molded Part Shrinkage and Warpage", "Specialized Molding Techniques", "Rotational Molding Technology", and "Handbook of Mold, Tool and Die Repair Welding", all part of the *Plastics Design Library* series published by Elsevier, one can make articles of any conceivable shape and appearance using compounds of the present invention.

In some embodiments, the thermoplastic elastomer compound can be foamed by further processing. For example, the thermoplastic elastomer compound can be further combined with a physical foaming agent, such as carbon dioxide, nitrogen, or air, and/or a chemical foaming agent, such as organic or inorganic compounds that release gases upon decomposition, and can be molded, extruded, or otherwise formed into a foamed plastic article, as known to those skilled in the art of thermoplastics polymer engineering.

Additionally, in some embodiments, the thermoplastic elastomer compounds and/or plastic articles formed therefrom can be at least partially crosslinked, or, in some embodiments, fully crosslinked, by further processing. For example, crosslinking can be performed by chemical crosslinking techniques or by irradiation crosslinking techniques, as known to those skilled in the art of thermoplastics polymer engineering.

In some embodiments, the present invention is directed to methods of making a plastic article. The method includes the steps of (a) providing the thermoplastic elastomer compound as described herein, and (b) forming the compound into the plastic article.

Usefulness of the Invention

As discussed above, it has been found that, by adding high softening point tackifier to polyolefin elastomer to provide a thermoplastic elastomer compound, the POE Tan Delta Peak Temperature of the polyolefin elastomer can be shifted to a higher temperature (i.e., the Compound Tan Delta Peak Temperature). Advantageously, the damping capacity of the polyolefin elastomer can be increased for an intended end-use application at a given temperature, for example, at least −10° C., or at least 0° C., or at room temperature, or greater than room temperature.

Accordingly, thermoplastic elastomer compounds of the present invention can be used for any plastic article which needs physical properties of a TPE, such as flexibility, elongation, and/or a soft or silky feel, while also providing useful damping capacity for applications at temperatures that are, for example, at least −10° C., or at least 0° C., or at room temperature, or greater than room temperature.

Because of its usefulness and versatility, the thermoplastic elastomer compound of the present invention has potential for a variety of damping applications in many different industries, including but not limited to: automotive and transportation; household appliances; industrial equipment; electronics; acoustics; communications; healthcare and medical; defense; security; personal safety; sports protection; and other industries or applications benefiting from the compound's unique combination of properties.

Examples

Non-limiting examples of thermoplastic elastomer compounds of various embodiments of the present invention are provided.

Table 2 below shows sources of ingredients for the thermoplastic elastomer compounds of Examples 1 to 13 and Comparative Examples A to B.

TABLE 2

| Ingredient Description | Brand | Source |
|---|---|---|
| Styrene-(ethylene/butylene)-styrene block copolymer | KRATON G1651 | Kraton Polymers |
| Styrene-(ethylene/ethylene/propylene)-styrene block copolymer | SEPTON 4055 | Kuraray |
| Polypropylene homopolymer | FORMOLENE 1102 | Formosa Plastics |
| Polyolefin elastomer | VISTAMAXX 3000 | ExxonMobil Chemical |
| Polyolefin elastomer | INFUSE D9100 | Dow |
| Polyolefin elastomer | ENGAGE 8540 | Dow |
| Ethylene-vinyl acetate copolymer | EL VAX 460 | DuPont |
| Hydrocarbon resin | PLASTOLYN R1140 | Eastman Chemical |
| White oil | 380 vis oil | (multiple) |
| Calcium carbonate (limestone) | VICRON 25-11 | Specialty Minerals |
| Wax | KEMAMIDE E | PMC Biogenix |
| Antioxidant | IRGANOX 1010 | BASF |

Examples of the thermoplastic elastomer compound were compounded and extruded as pellets on a twin extruder at a temperature of 400° F. and a mixing speed of 500 rpm. Subsequently, test specimen plaques were prepared by injection molding and then evaluated for the reported properties.

Table 3 below shows the formulations and certain properties of Comparative Example A.

TABLE 3

| | A | |
|---|---|---|
| Example Ingredient | Wt. Parts | Wt. % |
| KRATON G1651 | 100 | 42.48 |
| 380 vis oil | 100 | 42.48 |
| FORMOLENE 1102 | 35 | 14.87 |
| IRGANOX 1010 | 0.2 | 0.08 |
| KEMAMIDE E | 0.2 | 0.08 |
| TOTAL | 235.4 | 100.00 |
| Properties | | |
| Hardness (Shore A) (ASTM D2240) | 50 | |
| Rebound Height (%) (ASTM D2632) | 28 | |
| Tan Delta Peak Height (unitless) | (not reported) | |
| Tan Delta Peak Temperature (° C.) | (not reported) | |

Table 4 below shows the formulations and certain properties of Examples 1 to 4.

TABLE 4

| | Example | | | | | |
|---|---|---|---|---|---|---|
| | 1 | | 2 | | 3 | |
| | Wt. Parts | Wt. % | Wt. Parts | Wt. % | Wt. Parts | Wt. % |
| Ingredient | | | | | | |
| SEPTON 4055 | 9.00 | 4.36 | 9.00 | 4.27 | 12.00 | 5.37 |
| 380 vis oil | 27.00 | 13.07 | 27.00 | 12.82 | 36.00 | 16.10 |
| VISTAMAXX 3000 | 100.00 | 48.40 | 100.00 | 47.48 | 100.00 | 44.72 |
| PLASTOLYN R1140 | 30.00 | 14.52 | 40.00 | 18.99 | 40.00 | 17.89 |
| FORMOLENE 1102 | 20.00 | 9.68 | 10.00 | 4.75 | 10.00 | 4.47 |
| VICRON 25-11 | 20.00 | 9.68 | 24.00 | 11.40 | 25.00 | 11.18 |
| IRGANOX 1010 | 0.30 | 0.15 | 0.30 | 0.14 | 0.30 | 0.13 |
| KEMAMIDE E | 0.30 | 0.15 | 0.30 | 0.14 | 0.30 | 0.13 |
| TOTAL | 206.60 | 100.00 | 210.60 | 100.00 | 223.60 | 100.00 |
| Ingredient Ratios | | | | | | |
| POE:SBC | 11.11:1 | | 11.11:1 | | 8.33:1 | |
| POE:Tackifier | 3.33:1 | | 2.50:1 | | 2.50:1 | |
| Properties | | | | | | |
| Hardness (Shore A) (ASTM D2240) | 72 | | 63 | | 59 | |
| Rebound Height (%) (ASTM D2632) | 12 | | 9 | | 9 | |
| Tan Delta Peak Temperature (° C.) | 16 | | 17 | | 17 | |
| Tan Delta Peak Height (unitless) | 0.27 | | 0.30 | | 0.37 | |

TABLE 4-continued

|  | Example 4 | |
|---|---|---|
| Ingredient | Wt. Parts | Wt. % |
| SEPTON 4055 | 12.00 | 4.86 |
| 380 vis oil | 36.00 | 14.59 |
| VISTAMAXX 3000 | 100.00 | 40.54 |
| PLASTOLYN R1140 | 60.00 | 24.32 |
| FORMOLENE 1102 | 10.00 | 4.05 |
| VICRON 25-11 | 28.00 | 11.35 |
| IRGANOX 1010 | 0.35 | 0.14 |
| KEMAMIDE E | 0.35 | 0.14 |
| TOTAL | 246.70 | 100.00 |
| Ingredient Ratios | | |
| POE:SBC |  | 8.33:1 |
| POE:Tackifier |  | 1.67:1 |
| Properties | | |
| Hardness (Shore A) (ASTM D2240) |  | 55 |
| Rebound Height (%) (ASTM D2632) |  | 6 |
| Tan Delta Peak Temperature (° C.) |  | 30 |
| Tan Delta Peak Height (unitless) |  | 0.40 |

Table 5 below shows the formulations and certain properties of Examples 5 to 10 and Comparative Example B.

TABLE 5

| Example Ingredient | B Wt. Parts | B Wt. % | 5 Wt. Parts | 5 Wt. % | 6 Wt. Parts | 6 Wt. % | 7 Wt. Parts | 7 Wt. % | 8 Wt. Parts | 8 Wt. % | 9 Wt. Parts | 9 Wt. % |
|---|---|---|---|---|---|---|---|---|---|---|---|---|
| KRATON G1641 | 100.00 | 28.46 | 100.00 | 21.44 | 100.00 | 17.20 | 100.00 | 14.45 | 100.00 | 14.88 | 100.00 | 15.82 |
| 380 vis oil | 80.00 | 22.77 | 80.00 | 17.15 | 80.00 | 13.76 | 80.00 | 11.56 | 80.00 | 11.90 | 120.00 | 18.99 |
| VISTAMAXX 3000 | — | — | 100.00 | 21.44 | 200.00 | 34.40 | 300.00 | 43.35 | 300.00 | 44.64 | 200.00 | 31.65 |
| PLASTOLYN R1140 | 100.00 | 28.46 | 100.00 | 21.44 | 100.00 | 17.20 | 100.00 | 14.45 | 100.00 | 14.88 | 120.00 | 18.99 |
| FORMOLENE 1102 | 30.00 | 8.54 | 30.00 | 6.43 | 30.00 | 5.16 | 30.00 | 4.34 | 10.00 | 1.49 | 10.00 | 1.58 |
| VICRON 25-11 | 40.00 | 11.38 | 55.00 | 11.79 | 70.00 | 12.04 | 80.00 | 11.56 | 80.00 | 11.90 | 80.00 | 12.66 |
| IRGANOX 1010 | 0.70 | 0.20 | 0.70 | 0.15 | 0.70 | 0.12 | 1.00 | 0.14 | 1.00 | 0.15 | 1.00 | 0.16 |
| KEMAMIDE E | 0.70 | 0.20 | 0.70 | 0.15 | 0.70 | 0.12 | 1.00 | 0.14 | 1.00 | 0.15 | 1.00 | 0.16 |
| TOTAL | 351.40 | 100.00 | 466.40 | 100.00 | 581.40 | 100.00 | 692.00 | 100.00 | 672.00 | 100.00 | 632.00 | 100.00 |
| Ingredient Ratios | | | | | | | | | | | | |
| POE:SBC | — | | 1:1 | | 2:1 | | 3:1 | | 3:1 | | 2:1 | |
| POE:Tackifier | — | | 1:1 | | 2:1 | | 3:1 | | 3:1 | | 1.67:1 | |
| Properties | | | | | | | | | | | | |
| Hardness (Shore A) (ASTM D2240) | 43 | | 49 | | 58 | | 61 | | 58 | | 44 | |
| Rebound Height (%) (ASTM D2632) | 4 | | 6 | | 9 | | 11 | | 9 | | 6 | |
| Tan Delta Peak Temperature (° C.) | 13 | | 20 | | 16 | | 9 | | 10 | | 3 | |
| Tan Delta Peak Height (unitless) | 0.45 | | 0.38 | | 0.38 | | 0.41 | | 0.52 | | 0.45 | |

TABLE 5-continued

| | 10 | |
|---|---|---|
| Example Ingredient | Wt. Parts | Wt. % |
| KRATON G1641 | 100.00 | 13.66 |
| 380 vis oil | 120.00 | 16.39 |
| VISTAMAXX 3000 | 300.00 | 40.98 |
| PLASTOLYN R1140 | 120.00 | 16.39 |
| FORMOLENE 1102 | 10.00 | 1.37 |
| VICRON 25-11 | 80.00 | 10.93 |
| IRGANOX 1010 | 1.00 | 0.14 |
| KEMAMIDE E | 1.00 | 0.14 |
| TOTAL | 732.00 | 100.00 |
| Ingredient Ratios | | |
| POE:SBC | | 3:1 |
| POE:Tackifier | | 2.5:1 |
| Properties | | |
| Hardness (Shore A) (ASTM D2240) | | 53 |
| Rebound Height (%) (ASTM D2632) | | 7 |
| Tan Delta Peak Temperature (° C.) | | 15 |
| Tan Delta Peak Height (unitless) | | 0.45 |

Table 6 below shows the formulations and certain properties of Examples 11 to 13.

TABLE 6

| | 11 | | 12 | | 13 | |
|---|---|---|---|---|---|---|
| Example Ingredient | Wt. Parts | Wt. % | Wt. Parts | Wt. % | Wt. Parts | Wt. % |
| SEPTON 4055 | 12.00 | 4.86 | 12.00 | 4.86 | 12.00 | 4.86 |
| 380 vis oil | 36.00 | 14.59 | 36.00 | 14.59 | 36.00 | 14.59 |
| INFUSE D9100 | 110.00 | 44.59 | — | — | — | — |
| ENGAGE 8540 | — | — | 110.00 | 44.59 | — | — |
| ELVAX 460 | — | — | — | — | 110.00 | 44.59 |
| PLASTOLYN R1140 | 60.00 | 24.32 | 60.00 | 24.32 | 60.00 | 24.32 |
| VICRON 25-11 | 28.00 | 11.35 | 28.00 | 11.35 | 28.00 | 11.35 |
| IRGANOX 1010 | 0.35 | 0.14 | 0.35 | 0.14 | 0.35 | 0.14 |
| KEMAMIDE E | 0.35 | 0.14 | 0.35 | 0.14 | 0.35 | 0.14 |
| TOTAL | 246.70 | 100.00 | 246.70 | 100.00 | 246.70 | 100.00 |
| Ingredient Ratios | | | | | | |
| POE:SBC | | 9.17:1 | | 9.17:1 | | 9.17:1 |
| POE:Tackifier | | 1.83:1 | | 1.83:1 | | 1.83:1 |
| Properties | | | | | | |
| Hardness (Shore A) (ASTM D2240) | | 46 | | 73 | | 65 |
| Rebound Height (%) (ASTM D2632) | | 17 | | 15 | | 13 |
| Tan Delta Peak Temperature (° C.) | | (not reported) | | (not reported) | | (not reported) |
| Tan Delta Peak Height (unitless) | | (not reported) | | (not reported) | | (not reported) |

Without undue experimentation, those having ordinary skill in the art can utilize the written description of the present invention, including the Examples, to formulate thermoplastic elastomer compounds which are based on TPE other than SBC (i.e., compounds which include less than a major amount of SBC or which are free of SBC), but which also exhibit useful damping properties at or above room temperature.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A thermoplastic elastomer compound comprising:
   (a) polyolefin elastomer having a POE Tan Delta Peak Temperature;
   (b) tackifier having a softening point of at least about 80° C. according to ASTM 6493; and
   (c) optionally, styrenic block copolymer having a SBC Tan Delta Peak Temperature, provided that, when the styrenic block copolymer is present, the polyolefin elastomer is present relative to the styrenic block copolymer at a weight ratio of no less than about 1:1;
   wherein the compound has a Compound Tan Delta Peak Temperature, and the Compound Tan Delta Peak Temperature is greater than the POE Tan Delta Peak Temperature;
   wherein, when the styrenic block copolymer is present, the Compound Tan Delta Peak Temperature is greater than the SBC Tan Delta Peak Temperature; and
   wherein the thermoplastic elastomer compound is a non-adhesive thermoplastic elastomer compound.

2. The compound of claim 1, wherein the styrenic block copolymer is present, and wherein the weight ratio of polyolefin elastomer to styrenic block copolymer is no less than about 3:1.

3. The compound of claim 1, wherein the styrenic block copolymer is present, and wherein the weight ratio of polyolefin elastomer to styrenic block copolymer is no less than about 8:1.

4. The compound of claim 1, wherein the styrenic block copolymer is selected from the group consisting of styrene-ethylene/butylene-styrene (SEBS) block copolymer, styrene-ethylene/propylene-styrene (SEPS) block copolymer, styrene-ethylene/ethylene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

5. The compound of claim 1, wherein the compound includes the styrenic block copolymer, and the styrenic block copolymer consists of styrene-ethylene-ethylene/propylene-styrene (SEEPS) block copolymer.

6. The compound of claim 1, wherein the compound is free of styrenic block copolymer.

7. The compound of claim 1, wherein the polyolefin elastomer is selected from the group consisting of propylene-based elastomers, ethylene/α-olefin random copolymers, ethylene/α-olefin block copolymers, ethylene-vinyl acetate copolymers, and combinations thereof.

8. The compound of claim 1, wherein the polyolefin elastomer is propylene-based elastomer comprising (a) at least about 60 weight percent of propylene-derived units, (b) at least about 6 weight percent of ethylene-derived units, and (c) from about 0.3 to about 10 weight percent of diene-derived units, based on a combined weight of the propylene-derived units, the ethylene-derived units, and the diene-derived units.

9. The compound of claim 1, wherein the POE Tan Delta Peak Temperature is from about −65° C. to about −20° C.

10. The compound of claim 1, wherein the Compound Tan Delta Peak Temperature is at least 3° C.

11. The compound of claim 1, wherein the tackifier has a softening point ranging from about 80° C. to about 150° C. according to ASTM 6493.

12. The compound of claim 1, wherein the tackifier has a weight average molecular weight ranging from about 400 to about 3,500.

13. The compound of claim 1, wherein the tackifier comprises a saturated cyclo-aliphatic amorphous hydrocarbon resin.

14. The compound of claim 1, wherein a weight ratio of the polyolefin elastomer relative to the tackifier is from about 1:1 to about 3:1.

15. The compound of claim 1, wherein the compound further comprises non-elastomeric thermoplastic polymer.

16. The compound of claim 1, wherein the compound further comprises at least one additive selected from the group consisting of antioxidants and stabilizers; blowing and foaming agents; colorants; crosslinking agents; fillers; flame retardants and smoke suppressants; impact modifiers; plasticizers; ultraviolet light absorbers; waxes; and combinations thereof.

17. A plastic article formed from the compound of claim 1.

18. The plastic article of claim 17, wherein the plastic article is foamed.

19. The plastic article of claim 17, wherein the plastic article is at least partially crosslinked.

20. A method of making a plastic article, the method comprising the steps of:
(a) providing the compound of claim 1; and
(b) forming the compound into the plastic article.

21. The compound of claim 10, wherein the Compound Tan Delta Peak Temperature is in the range of 5° C. to 50° C.

22. The compound of claim 1, wherein the polyolefin elastomer is selected from ethylene/α-olefin random copolymers, ethylene/α-olefin block copolymers, ethylene-vinyl acetate copolymers, and combinations thereof.

* * * * *